United States Patent [19]

Ryan

[11] Patent Number: 4,778,244

[45] Date of Patent: Oct. 18, 1988

[54] OPTICAL FIBRE CABLE UTILIZING THERMOTROPIC LIQUID CRYSTAL POLYMER AND METHOD OF MAKING SAME

[75] Inventor: Timothy G. Ryan, Chester, United Kingdom

[73] Assignee: Imperial Chemical Industries PLC, London, England

[21] Appl. No.: 40,758

[22] Filed: Apr. 20, 1987

Related U.S. Application Data

[63] Continuation of Ser. No. 619,194, Jun. 11, 1984, abandoned.

[30] Foreign Application Priority Data

Jun. 20, 1983 [GB] United Kingdom ............... 8316739
Oct. 24, 1983 [GB] United Kingdom ............... 8328369

[51] Int. Cl.⁴ .......................... G02B 6/44; B05D 5/06; C09K 19/00
[52] U.S. Cl. ............................. 350/96.23; 350/96.30; 350/96.33; 350/96.34; 350/320; 427/163; 427/356; 428/1; 428/364; 428/395
[58] Field of Search ............ 350/96.23, 96.29, 96.30, 350/96.32, 96.33, 96.34, 320, 96.10; 528/125, 190, 191, 192, 193, 194; 427/162, 163, 356, 358; 428/1, 364, 395

[56] References Cited

U.S. PATENT DOCUMENTS

| | | | |
|---|---|---|---|
| 4,161,470 | 7/1979 | Calundann | 260/40 P |
| 4,410,683 | 10/1983 | Gale | 528/191 |
| 4,553,815 | 11/1985 | Martin | 350/96.23 |
| 4,645,297 | 2/1987 | Yoshihara et al. | 350/96.23 |
| 4,705,353 | 11/1987 | Wagoner | 350/96.23 |

FOREIGN PATENT DOCUMENTS

| | | | |
|---|---|---|---|
| 0091253 | 12/1923 | European Pat. Off. | 350/96.23 |
| 0129372 | 12/1984 | European Pat. Off. | 350/96.23 X |
| 3108109 | 9/1982 | Fed. Rep. of Germany | 350/96.23 |
| 1371740 | 10/1974 | United Kingdom | 350/96.30 |
| 1538853 | 1/1979 | United Kingdom | 350/96.30 |

OTHER PUBLICATIONS

Katsuyama et al., "Transmission Loss of Coated Single-Mode Fiber at Low Temperatures" Applied Optics vol. 19, No. 24, 12/80, pp. 4200–4205.

Lagakos et al., "Minimizing Temperature Sensitivity of Optical Fibers" Applied Optics, vol. 20, No. 19, 10/81, pp. 3276–3278.

Primary Examiner—William L. Sikes
Assistant Examiner—Brian M. Healy
Attorney, Agent, or Firm—Cushman, Darby & Cushman

[57] ABSTRACT

Optical fibre cables are produced containing an extruded support member of thermotropic liquid crystalline polymer in which the extrusion conditions are used to control the thermal expansion coefficient of the support member. The support member may be extruded on to the support member. In this case extrusion conditions may be used to induce a compressive strain on the fibre which can counteract the thermal change in length of the fibre when subject to temperature variations so that a cable having temperature variation can be produced. Support members which provide a loose fitting sleeve over the fibre can be produced by control of extrusion conditions to have a thermal expansion coefficient of not less than $-5 \times 10^{-6}/°K$.

13 Claims, 1 Drawing Sheet

OPTICAL FIBRE CABLE UTILIZING THERMOTROPIC LIQUID CRYSTAL POLYMER AND METHOD OF MAKING SAME

This is a continuation of application Ser. No. 619,194, filed June 11, 1984, which was abandoned upon the filing hereof.

This invention relates to an improved optical fibre cable in which an optical fibre is provided with a coating of a thermotropic polymer.

BACKGROUND OF THE INVENTION

Fibre-optic cables are rapidly gaining in preference over metallic wire electrical cables for a variety of reasons, especially the wide band width and low attenuation which are characteristic of optical fibres. Optical fibres, however, are generally very thin and unable to withstand appreciable mechanical loading, and thus do not aid in strengthening the cable as do the metallic wires of electric wire cables. As a result, special measures must be taken to reinforce fibre-optic cable because the transmission capability of optical fibres deteriorates as the fibres are subjected to strain. Below a certain level of strain, the deterioration is reversible and it is thus permissible during cable installation to subject the fibre to a moderate strain. The cable must not be subject to even this moderate level of strain during operation. Above that level of strain, however, the deterioration is permanent and is thus not permissible at any stage of handling operation. Thus, it is critical that stresses incurred during handling and operation be prevented from excessively straining the optical fibre.

Various constructions of cable have been proposed which incorporate strength members to reinforce the cable. These constructions include strength members made of metal, pultruded glass rods, polyesters, polyamides, including the wholly aromatic polyamide, p-phenylene terephthalamide. Such constructions have presented one or more disadvantages such as difficulty in fabrication, the presence of an electrically conductive component in the cable, undesirable thermal expansion and contraction under extreme temperature variations and excessive weight and cross-sectional area of the cable. It has been proposed in European patent application No. 83301724.7 (U.S. Ser. Nos. 364,823 and 364,824) to overcome these problems by providing a stiffening support in the cable made from a thermotropic liquid crystalline polymer. The present invention is a development of such use of thermotropic polymers in optical fibre cable.

SUMMARY OF THE INVENTION

According to the present invention there is provided an optical fibre cable in which a thermotropic liquid crystalline polymer is used to provide a support member in the cable characterised in that said polymer is present as a coating surrounding and contacting the optical fibre.

European patent application No. 83301724.7 describes stiffening supports in the form of channel members, such as a hollow tube, and a central core having a plurality of projections radiating outward therefrom to form channels in which optical fibres can be located. The provision of a cable in which the optical fibre is surrounded and contacted by a thin sheath of thermotropic polymer has been found to give rise to a number of advantages. The cable of the invention provides an assembly which is ideally suited to withstanding the strains occurring during handling of the cable during installation and strain arising in the working lifetime of the cable. In addition, the assembly provides a cable of minimum weight and volume whilst having ample strength.

DESCRIPTION OF PREFERRED EMBODIMENTS

The coating of thermotropic polymer surrounding and contacting the optical fibre may be provided by conventional extrusion techniques. Suitable extrusion apparatus are described for example, in the "Plastics Engineering Handbook" of the Society of the Plastics Industry, pages 156 to 203, 4th Edition, edited by Joel Frados, Van Nostrand Reinhold Company, 1976. Such apparatus can be used to extrude the thermotropic coating directly on the optical fibre. It has been found that the performance of the cable produced is very significantly effected by the relation between the dimensions of the extruded coating and the die through which it is drawn. The coating may be either drawn down to a reduced cross-section or subject to die swell to give an increased cross-section relative to the die. The extent of draw down or die swell is expressed as the ratio of the cross sectional area of the die to the cross sectional area of the coated fibre and hereinafter is termed draw ratio or die swell ratio respectively.

When maximum molecular orientation and hence stiffness is required the draw down ratio should be as high as possible but this requirement must be balanced by the recognition that if the coating thickness is too small the cable will be unable to withstand the strains to which it might reasonably be subjected during installation, for example, when pulling the cable through ducting or conduits. It is preferred that the draw ratio used during extrusion is such as to provide a coated cable having a load capacity in excess of 5 kilogram when subject to a strain of 0.2%. In general the draw ratio is preferably less than 4, although ratios of up to 10 or even 20 may be used. It is noted that European patent application No. 83301724.7 recommends the use of draw ratios between 4 and 100, preferably between 10 and 50 when preparing extruded stiffening members.

The draw down or die swell have a very significant effect on the linear thermal expansion coefficient of the thermotropic polymer sleeve. The expansion coefficients of the components of an optical fibre cable are of great significance because if the expansion and contraction of the components at extremes of temperature are significantly different from the optical fibre the optical fibre may be subject in service to excessive deformation and, hence, loss of properties. In the situation where the optical fibre is only loosely associated with the stiffening member as described in European patent application No. 83301724.7 it is stated that the coefficient of linear thermal expansion of the stiffening members is negative and is preferably within the range $-10 \times 10^{-6}$ to $-4 \times 10^{-6}/°F$. ($-18 \times 10^{-6}$ to $-7.2 \times 10^{-6}/°K$.) compared with values of between $+0.25 \times 10^{-6}$ and $+1.25 \times 10^{-6}/°F$. ($0.45 \times 10^{-6}$ to $2.25 \times 10^{-6}/°K$.) for commercially available glass optical fibres. In the coated fibres of the present invention the linear thermal coefficient can be positive. If negative the coefficient is preferably not less than $-10^{-5}/°K$.

The linear thermal expansion coefficient of the coating may be controlled by the extrusion conditions, positive coefficients being obtained at near zero values of draw down or when conditions for induced die swell are used. Close matching of the expansion coefficient of the optical fibre and the thermotropic polymer coating enables the cable to remain functional over a wide temperature range, for example from $-50°$ C. to $+150°$ C., without loss of its light transmission properties. Thus a glass optical fibre will only tolerate up to $\pm 0.2$ to 0.3% strain before the optical properties deteriorate. Cable according to the present invention can readily be produced which because of the matching of expansion coefficients will be capable of withstanding strains induced over a 200° C. temperature range.

Conditions may be also chosen so that the compressive strain induced on the optical fibre resulting from the extrusion coating process is used to restrain the change in length which would normally occur when an optical fibre is subjected to a variation in temperature, so that a cable is produced in which the optical fibre has an optical path length which is substantially independent of temperature or has reduced sensitivity to temperature variation. This is achieved by using extrusion conditions to control the thermal expansion coefficient of the coating so that it is less than that of the optical fibre.

In another aspect of the invention the extrusion conditions are used to control the linear thermal expansion behaviour of the thermotropic extrudate to provide a sheath for the optical fibre having a linear thermal expansion coefficient of greater than $-5 \times 10^{-6}/°K$. and which, preferably, is positive. This sheath may surround and contact the optical fibre or alternatively the inside diameter of sheath may be greater than the diameter of the optical fibre so that the optical fibre is provided with a loosely fitting sleeve of thermotropic polymer. Such a cable differs from those described in European patent application No. 83301724.7 in that it has a higher and preferably positive linear thermal expansion coefficient. The closer the diameter of the fibre to the inside diameter of the sleeve the more closely must the thermal expansion coefficient of the sleeve approach the positive expansion coefficient of the optical fibre.

It will be appreciated that because the linear thermal expansion coefficients most closely matching that of the optical fibre is generally obtained at zero draw down or under induced die swell conditions the modulus of the resulting coating will not benefit from the molecular orientation induced by high draw down values. Nevertheless the considerable molecular ordering normally present in thermotropic polymer melts will provide a good level of modulus even without high draw down. Modulus values of 5 GPa and stress-at-break values of 140 MPa are readily obtainable.

Coatings having a negative linear thermal expansion coefficient are useful even though used in conjunction with optical fibres having a positive coefficient. For example coatings having a coefficient of $-10^{-5}/°K$. (obtained by draw down) will produce a compressive strain on glass optical fibre of only 0.1% over a 100° C. temperature range. This provides a cable having a safety factor of 0.1% under tension over this temperature range before the glass fibre is subject to any stress. This type of cable would have high modulus and high load bearing properties and such a cable would have the dual benefits of resistance to tensile strain during installation and that due to thermal cycling in use.

Although high modulus properties are beneficial in terms of load bearing properties the stiffness may be a disadvantage in construction of multifibre cables and in installation. In such circumstances the lower modulus (resulting from lower draw down or induced die swell) may have advantages. The compact nature of the coated fibre cables of the present invention enable compact multifibre cable of minimum dimensions to be produced.

The optical fibres used in the cables of the present invention, particularly glass optical fibres, are normally provided with a coating of a resilient material to preserve the fibre in its pristine condition as far as is possible. Typical materials are of low tensile modulus and include silicone rubbers, polysiloxanes and polyurethanes. Typically, a glass optical fibre of diameter 100 micron will carry a coating of buffer material resulting in an overall diameter of 250 to 500 microns. Thus although in some circumstances it may be possible to apply the thermotropic polymer coating to the optical fibre immediately following the manufacture of the optical fibre so that the thermotropic coating itself provides the buffer coating, in normal circumstances the thermotropic polymer will be applied to the optical fibre as supplied by the manufacturer, carrying its buffer coating. In the context of this application the term "optical fibre" is to be taken to include any buffer coating unless otherwise stated. The construction of a simple cable according to the invention is illustrated in the Figure accompanying this specification showing a sectional view of such a cable.

BRIEF DESCRIPTION OF THE DRAWINGS

In FIG. 1 an optical fibre core 10 carrying a low modulus coating 11 is surrounded by an extruded coating of a thermotropic polymer 12.

FIG. 2 shows the change in length with temperature of coaterd fibres having various diameters dependent on the haul off rate during production and correspond with the products of Examples 8, 9 and 10.

Figure 1:
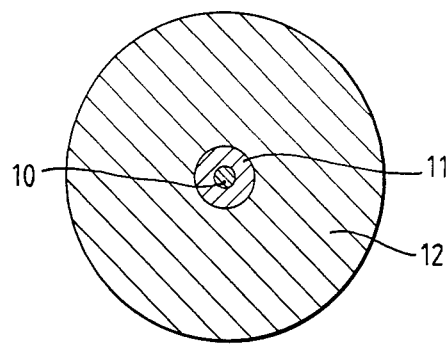
FIG. 1 is a cross-sectional view of an optical fibre according to the present invention.

As already indicated the coated optical fibres of the invention may be used as individual cables or may be used in multifibre cables. The usual technique of construction may be used in such multifibre cables. The individual cables may be helically wound with respect to each other or may be wound on a central reinforcing core. Whether or not the cable used is an individual coated optical fibre or a multifibre cable it may be useful to overcoat the individual fibre cable or the multifibre cable with an inexpensive, scuff resistant polymer which also provides a ready means of producing a coloured surface. Typical polymers for this use include polyethylene, polypropylene and polyvinyl chloride.

The cables of the invention may be used in the form of very long lengths in communications networks or in shorter lengths for connecting the network to individual subscribers. The cable may also be used in optoelectronic applications such as sensors.

Thermotropic liquid crystal polymers for use in the invention include but are not limited to wholly aromatic polyesters, aromatic-aliphatic polyesters, aromatic polyazomethines, aromatic polyester-carbonates and wholly or non-wholly aromatic polyester-amides. The wholly aromatic polymers are considered to be "wholly" aromatic in the sense that each moiety present in the polymer contributes at leaast one aromatic ring to the polymer backbone and which enables the polymer to exhibit anisotropic properties in the melt phase.

The liquid crystal polymers which are preferred for use in the present invention are the thermotropic wholly aromatic polyesters. Such polymers include wholly aromatic polyesters and poly(ester-amide)s which are disclosed in commonly-assigned U.S. Pat. Nos. 4,067,852, 4,083,829, 4,130,545, 4,161,470, 4,184,996, 4,219,461, 4,224,433, 4,230,817, 4,238,598, 4,238,599, 4,244,433, 4,256,624, 4,279,803 and 4,299,756, and in commonly-assigned U.S. application Ser. Nos. 91,003, now U.S. Pat. No. 4,337,191, filed Nov. 5, 1979, 214,557, now U.S. Pat. No. 4,330,457, filed Dec. 9, 1980, 251,625, now U.S. Pat. No. 4,351,917, 251,629, now U.S. Pat. No. 4,351,918, each filed Apr. 6, 1981, 251,818 now U.S. Pat. No. 4,341,688 and 251,819, now U.S. Pat. No. 4,355,132, each filed Apr. 7, 1981, and 270,439, now U.S. Pat. No. 4,339,375, filed June 4, 1981. The disclosures of all of the above-identified commonly-assigned U.S. patents and applications are herein incorporated by reference in their entirety. The wholly aromatic polymers disclosed therein typically are capable of forming an anisotropic melt phase at a temperature below approximately 400° C., and preferably below approximately 350° C.

The invention is further illustrated by reference to the following examples.

EXAMPLE 1

A wholly aromatic polyester which exhibits thermotropic liquid crystalline properties was selected for use in the formation of melt extruded coatings in accordance with the present invention. The wholly aromatic polymer was formed in accordance with the teachings of U.S. Pat. No. 4,161,470 and consisted of 73 mole percent of p-oxybenzoyl units and 27 mole percent of 6-oxy-2-naphthoyl. The wholly aromatic polyester exhibited an intrinsic viscosity of 6.4 dl/g when dissolved in a concentration of 0.1 percent by weight in pentafluorophenol at 60° C.

The molten wholly aromatic polyester was extruded at 290° C. through a tapered circular die having a full entry angle of 40°, an outside diameter of 2 mm and an inside diameter of 1 mm positioned on a Betol 18 mm extruder. The molten polymer was quenched by dripping water onto the extrudate. The diameter of the tube was monitored and the haul off rate varied in the range 10–60 m/min to give tubing with and without draw down.

The following table summarises the properties of the tubing obtained. The tensile properties were measured using an Instrom 1113 at a crosshead speed of 5 mm/min, 23° C., 50% RH.

TABLE 1

| | Outside diameter mm | Tensile Modulus GPa | Stress at break MPa | Expansion coefficient × $10^{-6}$/°K. at 20° C. |
|---|---|---|---|---|
| No draw down | 2.17 | 5.2 | 138 | — |
| | 2.03 | — | — | 3.4 |
| Draw down | 1.80 | 13.6 | 205 | — |
| | 1.73 | — | — | −6.9 |
| | 1.01 | 17.0 | 320 | — |
| | 0.70 | 25.0 | 415 | −14.3 |

EXAMPLE 2

The procedure of Example 1 was repeated except in that the procedure was used to coat a glass optic fibre (carrying a silicone resin primary coating and having an outside diameter of 0.5 mm) under tube on extrusion conditions. The molten polymer was extruded through a tapered circular die having a full entry angle of 40°, an outside diameter of 2 mm and an inside diameter of 1 mm with the optical fibre being drawn through the centre of the die. The extrudate was passed into a quench bath having a length of 1.2 meters. The diameter of the secondary coated fibre was monitored and the haul off rate adjusted to produce a tube with a diameter of 2.25 mm. The expansion coefficient of the tube was measured using a Mettler TA3000 fitted with a thermomechanical analyser TMA40 and found to be $+15.6 \times 10^{-6}$/°K. at 20° C.

EXAMPLE 3

Example 2 was repeated and the haul off rate adjusted to give a tube with a diameter of 1.75 mm. The expansion coefficient was measured and found to be $-8.7 \times 10^{-6}$/°K. at 20° C. The residual fibre strain in the glass fibre, frozen in when the molten coating is cooled, was 0.05%.

EXAMPLE 4

Example 1 was repeated and an annealing oven 1.2 meters long, heated by hot air was inserted between two caterpillar haul-offs. The temperature of the tube during annealing was estimated to reach 225° C. The procedure was repeated without the annealing step. Measurement of the expansion behaviour over a range of temperature showed that without annealing the relationship between expansion coefficient and temperature becomes non-linear above about 35° C. With the annealing procedure the linear relation between expansion coefficient and temperature is maintained up to 100° C.

EXAMPLE 5

The molten wholly aromatic polyester used in Example 1 was used to tube-on extrusion coat a silica monomode fibre, 125 μm in diameter, with a silicone rubber coating, bringing the total diameter to 250 μm. The molten polymer was extruded through a tapered die 2 mm outside diameter, 1 mm inside diameter with the optic fibre drawn through the centre of the die. The extrudate was passed into a quench bath 1.2 meters long. A haul off speed of 10 m/min was used and a secondary coated fibre 0.9 mm in diameter was produced. The tension in the extrusion line was 100–125 g (~0.1% tensile strength). The level of strain locked into the fibre during the process was obtained by measuring the phase change of a modulated signal in the fibre against a reference as described by R. Kashyap. A tensile strain of 0.05% was recorded. The expansion coefficient calculated from measurements of phase change using the same apparatus, between −30° and +20° C. was $-3.7 \times 10^{-6}$. The tensile modulus of the coating was 21 GPa. R. Kashyap and M. H. Reeve in Electron Letters, Vol. 16, No. 18, pp 689–690, 1980.

EXAMPLE 6

The molten wholly aromatic polyester used in Example 1 was used to tube-on extrusion coat a graded index sodium borosilicate multimode optic fibre 125 μm in diameter with a silicone rubber coating bringing the total diameter to 250 μm. The molten polymer was extruded through a tapered die 1 mm outside diameter, 0.5 mm inside diameter.

A haul off speed of 17.5 m/s was used to produce a secondary coated fibre 1 mm in diameter. The coating had an expansion coefficient of $-2.3 \times 10^{-6}$ measured over the range of −20° to +30° C. and a tensile modulus of 13 GPa.

EXAMPLE 7

The procedure of Example 5 was repeated except a die with an outside diameter of 2 mm and an inside diameter of 1 mm. A haul off speed of 22 m/s was used to produce a coating 1 mm in diameter. The coating had an expansion coefficient of $-6.3 \times 10^{-6}$°K.$^{-1}$ and a tensile modulus of 26 GPa.

EXAMPLE 8

Figure 2:
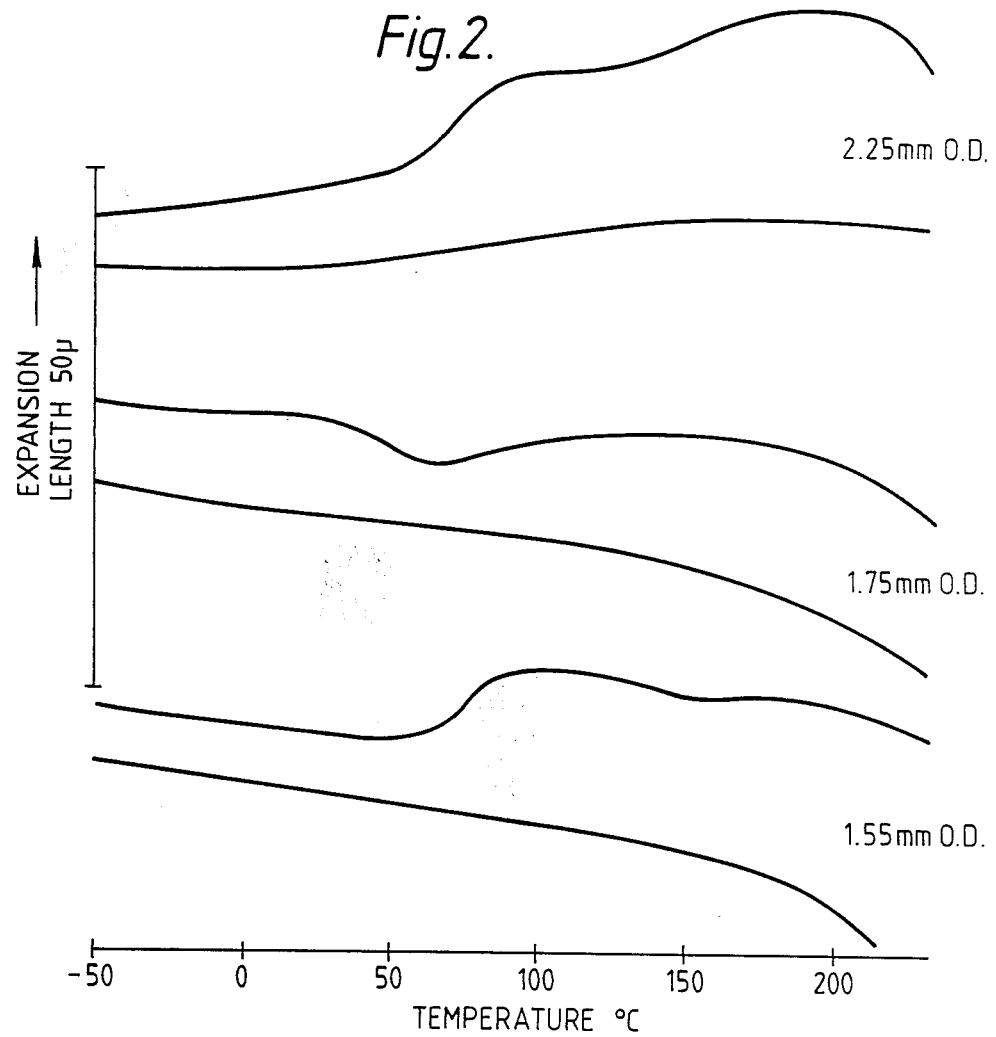
FIG. 2 is a graph of extension versus temperature.

The procedure of Example 5 was repeated except the procedure was used to coat a glass optic fibre with a silicone rubber primary coating having an outside diameter of 0.5 mm. The molten polymer was extruded through a tapered die with an outside diameter of 2 mm and an internal diameter of 1 mm. The haul off rate was adjusted to produce a secondary coated fibre with an external diameter of 2.25 mm. The change in length with temperature of the coating is shown in FIG. 2 measured over the range −50° to +250° C. at 10° C. min$^{-1}$ using a Mettler TA3000 fitted with a thermo mechanical analyser TMA 40. After cooling to room temperature the change in length with temperature was remeasured. This annealing treatment removes discontinuities in the expansion behaviour particularly at temperatures greater than 50° C. The positive trend is unaffected. Table 2 shows the change in expansion coefficient and the strain Δl/lo with temperature.

EXAMPLE 9

The procedure of Example 8 was repeated. The haul off rate was adjusted to give a coated fibre with an outside diameter of 1.75 mm. The change in length with temperature in FIG. 2 shows a negative trend. Table 3 shows the change in expansion coefficient and the strain Δl/lo with temperature.

EXAMPLE 10

The procedure of Example 8 was repeated. The haul off rate was adjusted to give a coated fibre with an outside diameter of 1.55 mm. Table 4 shows the change in expansion coefficient and the strain Δl/lo with temperature.

TABLE 2

| | Sample O/D 2.25 mm | | | |
|---|---|---|---|---|
| Temp. | Expansion Coefficient × $10^{-6}$ °K.$^{-1}$ | | Strain Δl/lo (%) | |
| °C. | Unannealed | Annealed | Unannealed | Annealed |
| −40 | 0.4 | 1.1 | 0 | 0 |
| −20 | 8.2 | 2.7 | 0.02 | 0.004 |
| 20 | 14.6 | 4.6 | 0.07 | 0.02 |
| 75 | 55.6 | 10.0 | 0.22 | 0.06 |
| 150 | 25.8 | 4.3 | 0.38 | 0.13 |

Δl/lo for silica taking α = 0.5 × $10^{-6}$ from −50 to +50 to +150° C. is 0.01%.

TABLE 3

| | Sample O/D 1.75 mm | | | |
|---|---|---|---|---|
| Temp. | Expansion Coefficient × $10^{-6}$ °K.$^{-1}$ | | Strain Δl/lo (%) | |
| °C. | Unannealed | Annealed | Unannealed | Annealed |
| −40 | −7.4 | −7.4 | 0 | 0 |
| −20 | −1.7 | −9.6 | −0.01 | −0.03 |
| 20 | −8.7 | −6.1 | −0.02 | −0.06 |
| 75 | 13.7 | −5.2 | −0.11 | −0.09 |

TABLE 3-continued

| | Sample O/D 1.75 mm | | | |
|---|---|---|---|---|
| Temp. | Expansion Coefficient × $10^{-6}$ °K.$^{-1}$ | | Strain Δl/lo (%) | |
| °C. | Unannealed | Annealed | Unannealed | Annealed |
| 150 | −5.2 | −17.0 | −0.06 | −0.17 |

TABLE 4

| | Sample O/D 1.55 mm | | | |
|---|---|---|---|---|
| Temp. | Expansion Coefficient × $10^{-6}$ °K.$^{-1}$ | | Strain Δl/lo (%) | |
| °C. | Unannealed | Annealed | Unannealed | Annealed |
| −40 | −5.9 | −5.5 | 0 | 0 |
| −20 | −5.1 | −5.5 | −0.02 | −0.02 |
| 20 | −3.9 | −5.1 | −0.03 | −0.03 |
| 75 | 50.6 | −8.6 | −0.05 | −0.09 |
| 150 | −13.7 | −11.7 | −0.06 | −0.14 |

I claim:

1. An optical fibre cable in which a thermotropic liquid crystalline polymer is used to provide a support member in the cable characterized in that said polymer is present as a coating surrounding and contacting the optical fibre, that the linear thermal expansion coefficient of the coating is negative and is less than that of the optical fibre, and wherein a strain of less than 0.2% is introduced into the optical fibre when the cable is subjected to temperatures over the range of −50° C. to +150° C.

2. An optical fibre cable according to claim 1 in which the support member has a load capacity of at least 5 kg when subject to a strain of 0.2%.

3. An optical fibre cable according to claim 1 in which the support member has a linear thermal expansion coefficient of not less than $-1 \times 10^{-5}$/°K.

4. An optical fibre cable according to claim 1 in which a thermotropic liquid crystalline polymer is used to provide a support member in the cable characterised in that the support member is in the form of a sheath having a linear thermal expansion coefficient which is negative and is not less than $-5 \times 10^{-6}$/°K.

5. An optical fibre cable according to either of claims 2 or 3 in which the linear thermal expansion coefficient of the support member closely matches the linear thermal expansion coefficient of the optical fibre.

6. A process of forming an optical fibre cable reinforced with a support member comprising melt extruding an elongated tube of thermotropic, liquid crystalline polymer through a die around an optical fibre under conditions such that the tube surrounds and contacts the optical fibre and the linear thermal expansion coefficient of the tube is negative and is less than that of the optical fiber and such that a strain of less than 0.2% is introduced into the optical fibre when the cable is subjected to temperatures over the range −50° C. to +150° C.

7. A process of extruding a support member according to claim 6 in which the draw down is controlled so as to produce a strength member having a linear thermal expansion coefficient not less than $-5 \times 10^{-6}$/°K.

8. A process of extruding a support member according to claim 6 in which the draw down is controlled so as to produce a strength member having a linear thermal expansion coefficient which closely matches that of the optical fibre selected for use in the optical fibre cable.

9. A process of forming an optical fibre cable according to claim 6 in which the compressive strain induced on the optical fibre from extruding the thermotropic fibre around the fibre is controlled by means of the extrusion conditions to counteract dimensional changes in the optical fibre resulting from temperature variations.

10. A process of forming an optical fibre cable according to claim 9 wherein the thermal expansion coefficient of the thermotropic coating is less than that of the optical fibre so that a compressive strain is induced on the optical fibre.

11. A process of forming an optical fibre cable according to claim 8 wherein the melt is extruded onto the optic fibre and the coated fibre leaving the die is subjected to conditions so that the ratio of the cross-sectional area of the die to the cross sectional area of the coated fibre produced is less than 4:1.

12. A process of forming a support member according to either of claims 6 or 11 in which the member formed by extrusion is annealed below the melting point of the thermotropic polymer.

13. An optical fibre cable according to either of claims 1 or 3 in which the linear thermal expansion coefficient of the coating surrounding and contacting the fibre is negative and the coating exerts a compressive strain on the optic fibre.

* * * * *